(12) United States Patent
Jeong et al.

(10) Patent No.: US 10,343,541 B2
(45) Date of Patent: Jul. 9, 2019

(54) APPARATUS AND METHOD FOR CHARGING ELECTRIC VEHICLE

(71) Applicants: Hyundai Motor Company, Seoul (KR); Kia Motors Corporation, Seoul (KR); Yura Corporation Co., Ltd., Gyeonggi-do (KR)

(72) Inventors: Myung Sun Jeong, Seoul (KR); Young Jong Lee, Seoul (KR); Hyun Yong Cho, Seoul (KR); Myoung Sik Kim, Seoul (KR)

(73) Assignees: Hyundai Motor Company, Seoul (KR); Kia Motors Corporation, Seoul (KR); Yura Corporation Co., Ltd., Seongnam, Gyeonggi-do (KR)

( * ) Notice: Subject to any disclaimer, the term of this patent is extended or adjusted under 35 U.S.C. 154(b) by 283 days.

(21) Appl. No.: 15/260,201

(22) Filed: Sep. 8, 2016

(65) Prior Publication Data

US 2017/0197519 A1    Jul. 13, 2017

(30) Foreign Application Priority Data

Jan. 7, 2016 (KR) .................. 10-2016-0002118

(51) Int. Cl.
*H02J 7/00* (2006.01)
*B60L 11/18* (2006.01)
(Continued)

(52) U.S. Cl.
CPC ............ *B60L 11/1846* (2013.01); *B60L 3/12* (2013.01); *B60L 53/11* (2019.02); *B60L 53/60* (2019.02);
(Continued)

(58) Field of Classification Search
CPC ............................ H02J 7/007; B60L 11/1846
(Continued)

(56) References Cited

U.S. PATENT DOCUMENTS

| 2010/0001687 A1* | 1/2010 | Watanabe | B60L 3/12 320/109 |
| 2010/0010698 A1* | 1/2010 | Iwashita | B60L 3/12 701/22 |
| 2013/0038424 A1* | 2/2013 | Katar | H04L 67/125 340/5.8 |
| 2014/0015494 A1* | 1/2014 | Kobayashi | B60L 3/0069 320/137 |

(Continued)

FOREIGN PATENT DOCUMENTS

| JP | 2012-235581 A | 11/2012 |
| JP | 2014-075969 A | 4/2014 |

(Continued)

*Primary Examiner* — Nathaniel R Pelton
*Assistant Examiner* — Tessema Kebede
(74) *Attorney, Agent, or Firm* — Mintz Levin Cohn Ferris Glovsky and Popeo, P.C.; Peter F. Corless (57) ABSTRACT

A method is provided for controlling engagement between a vehicle and a charging device includes: attempting to discover a charging device; when the charging device is discovered, identifying the discovered charging device on a list of charging equipment stored in the vehicle; determining a charging history count of the discovered charging device according to the stored list of charging equipment; when the charging history count of the discovered charging device is greater than or equal to a predetermined number, performing a charging operation with the discovered charging device; and when the charging history count of the discovered charging device is less than the predetermined number, performing a Signal Level Attenuation Characterization (SLAC) procedure against the discovered charging device.

20 Claims, 8 Drawing Sheets

(51) Int. Cl.
*B60L 3/12* (2006.01)
*B60L 53/60* (2019.01)
*B60L 53/63* (2019.01)
*B60L 53/65* (2019.01)
*B60L 53/10* (2019.01)

(52) U.S. Cl.
CPC ............... *B60L 53/63* (2019.02); *B60L 53/65* (2019.02); *H02J 7/007* (2013.01); *B60L 2240/80* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/169* (2013.01); *Y04S 10/126* (2013.01); *Y04S 30/14* (2013.01)

(58) Field of Classification Search
USPC ......................................................... 320/106
See application file for complete search history.

(56) References Cited

U.S. PATENT DOCUMENTS

| | | | |
|---|---|---|---|
| 2015/0017921 | A1* | 1/2015 | Choi ................... H04B 1/401 455/66.1 |
| 2015/0210175 | A1* | 7/2015 | Kang ................. B60L 11/1816 320/109 |

FOREIGN PATENT DOCUMENTS

| | | |
|---|---|---|
| JP | 2015-122887 A | 7/2015 |
| KR | 10-2013-0119815 A | 11/2013 |
| KR | 10-2013-0050312 A | 3/2014 |
| KR | 10-2014-0062300 A | 5/2014 |
| KR | 10-2015-0046421 A | 7/2015 |
| KR | 10-1539504 B1 | 7/2015 |
| KR | 2015-0090325 A | 8/2015 |
| KR | 10-2015-0103407 A | 11/2015 |
| WO | 2013-023164 A2 | 2/2013 |

* cited by examiner

| Buffer No. | MAC Address | PARM.CNF | ATTEN.IND | Attenuation Average |
|---|---|---|---|---|
| 1 | 00:00:00:00:00:11 | ○ | ○ | 10 |
| 2 | 00:00:00:00:00:22 | ○ | ○ | 34 |
| 3 | 00:00:00:00:00:33 | × | ○ | 65 |
| ... | | | | |
| 10 | | | | |

| No. | MAC Address | Attenuation Average | Charging History Count |
|---|---|---|---|
| 1 | 00:00:00:00:00:11 | 10 | 1 |
| 2 | | | |
| 3 | | | |
| ... | | | |
| 10 | | | |

APPARATUS AND METHOD FOR CHARGING ELECTRIC VEHICLE

CROSS-REFERENCE TO RELATED APPLICATION

This application claims priority to and the benefit of Korean Patent Application No. 10-2016-0002118, filed on Jan. 7, 2016 in the Korean Intellectual Property Office, the disclosure of which is hereby incorporated by reference in its entirety as if fully set forth herein.

TECHNICAL FIELD

The disclosure relates generally to an apparatus and a method suitable for charging an electric vehicle, and more particularly, to an apparatus and a method for controlling a discovery and recognition procedure between the electric vehicle and charging device, and for determining attenuation status of the charging device which becomes superannuated.

BACKGROUND

Environmentally friendly cars (also known as a green car or eco-friendly car), including both hybrid vehicles (HEV) and electric vehicles (EV), are well known. Typically, the HEV uses two or more distinct types of power such as an internal combustion engine and an electric motor, while the EV is propelled by one or more electric motors, using electrical energy stored in rechargeable batteries or other energy storage device. While operating, the HEV can use a generator to make a battery self-powered so that the self-powered battery can supply a power for vehicle operation. Particularly, the HEV can include a regenerative braking system which converts its kinetic energy occurred by a counter-rotating motor into an electric form either used immediately or stored in batteries in order to increase energy efficiency.

Like many electronic devices, the EV is designed to operate after being charged. If infrastructures for charging the EV are not enough, most people can be hard pressed to use the EV. To overcome such issues, a plug-in hybrid electric vehicle (PHEV) has been developed. The PHEV is a hybrid electric vehicle that uses rechargeable batteries, or other energy storage device, that can be recharged by plugging it in to an external source of electric power, usually a normal wall socket, which is distinguishable from conventional hybrid electric vehicles which use a generator to power the electric motor or to recharge the batteries.

Sufficient charging infrastructures may be required to use the PHEV or EV. Also, compatibility between different charging infrastructures a critical requisite to secure E-mobility for EVs. The infrastructure can be required to charge plural types of vehicles. Thus, a standard organization has tried to standardize a method or a technique for charging EVs. For example, in the International Electrotechnical Commission (IEC) which leads standardization for vehicle charging technique, the Technical Committee 69 (TC69) (i.e., Electric Road Vehicles and Electric Industrial Trucks) handles technical issues regarding a charging system, a charging interface, a communication protocol, and the like.

Standardized communication method can be required to secure a customer's safety and provide an effective service. Generally, two methods regarding the communication protocol for charging EVs have been developed. One is a Controller Area Network (CAN) technology used in a quick charging method for battery electric vehicles known as CHAdeMO, and the other is Power Line Communication (PLC) technology used in Combined Charging System (COMBO).

The Power Line Communication (PLC) technology can include a communication technique which transmits a low frequency (e.g., 50/60 Hz) power signal with a high frequency communication signal of dozens to hundreds KHz via a power line/cable. The communication between an electric vehicle and a charging device, which is internationally standardized in the PLC technology, can sequentially proceed with some predetermined procedures which are defined by the standard even if a function achieved by the predetermined procedures are not actually used, because of several reasons such as optional services suggestion, smart grid engagement, and the like. When there are plural charging devices adjacent to an electric vehicle, the electric vehicle may not be able to specify or recognize the charging device connected to the electric vehicle for performing charging operation. Since a single power cable can supply a power to several charging stations, the electric vehicle should recognize which one of charging stations is actually connected to the electric vehicle through a protocol. Unfortunately, another charging station which is not connected to the electric vehicle can respond because of undesired interference. In order to avoid this undesirable situation, the international standard defines a Signal Level Attenuation Characterization (SLAC). However, the described issues above are not completely resolved.

SUMMARY

An apparatus and a method for charging an electric vehicle can provide that the electric vehicle can specify or recognize charging device based on charging history information so as to reduce a time spent for discovering and recognizing the charging device which is connected to the electric vehicle for charging operation. Further, an apparatus and a method for charging an electric vehicle can understand an attenuation status of charging device or power cable, due to superannuation, which is coupled to the electric vehicle during procedures for charging operation.

In accordance with embodiments of the present disclosure, a method for controlling engagement between a vehicle and charging device includes: attempting to discover a charging device; when the charging device is discovered, identifying the discovered charging device on a list of charging equipment stored in the vehicle; determining a charging history count of the discovered charging device according to the stored list of charging equipment; when the charging history count of the discovered charging device is greater than or equal to a predetermined number, performing a charging operation with the discovered charging device; and when the charging history count of the discovered charging device is less than the predetermined number, performing a Signal Level Attenuation Characterization (SLAC) procedure against the discovered charging device.

The step of performing the SLAC procedure can include: sending an attenuation request signal; receiving one or more attenuation response signals; storing at least one first charging device corresponding to the received attenuation response signals in a buffer table; performing the charging operation with a charging device having the lowest attenuation value or average among the at least one first charging device, based on the received attenuation response signals; and storing information regarding the charging device used for the charging operation in the list of charging equipment after the charging operation is completed.

The step of performing the SLAC procedure can further include: requesting values of the attenuation response signals from at least one charging device; receiving the values of the attenuation response signals from the at least one charging device during a predetermined time; and storing at least one second charging device corresponding to the received values of the attenuation response signals in the buffer table.

The method may further include: when the at least one first charging device is the same as the at least one second charging device, overlapping information about both the at least one first charging device and the at least one second charging device at the same location in the buffer table; and when the at least one first charging device is different from the at least one second charging device, storing information about both the at least one first charging device and the at least one second charging device at different locations in the buffer table.

The step of sending the attenuation request signal can include: broadcasting a start attenuation signal at least three times; and transmitting an attenuation check signal repeatedly.

The step of storing the information regarding the charging device in the list of charging equipment can include: storing the last attenuation value or average of the charging device; and increasing a charging history count of the charging device by 1.

The step of performing the charging operation with the discovered charging device can include: measuring a signal level attenuation of the discovered charging device; when the measured signal level attenuation is within a predefined allowable range, proceeding with the charging operation; and when the measured signal level attenuation is outside of the predefined allowable range, stopping the charging operation.

The step of proceeding with the charging operation can include: carrying out the charging operation with the discovered charging device; comparing the measured signal level attenuation with an attenuation value or average stored in the list of charging equipment; and when a difference between the measured signal level attenuation and the stored attenuation value or average is outside of a predetermined range, providing a request for inspection or maintenance of a communication cable corresponding to the charging operation to the vehicle and the charging device used for the charging operation.

The list of charging equipment can store a Media Access Control (MAC) address of the discovered charging device.

Furthermore, according to embodiments of the present disclosure, an apparatus for executing a charging operation with a charging device in a vehicle includes: a first storage including a list of charging equipment used for previous charging operations; a communication module attempting to discover a charging device; and a controller configured to: when the charging device is discovered, identify the discovered charging device on the list of charging equipment; determine a charging history count of the discovered charging device according to the list of charging equipment; when the charging history count of the discovered charging device is greater than or equal to a predetermined number, perform a charging operation with the discovered charging device; and when the charging history count of the discovered charging device is less than the predetermined number, perform a Signal Level Attenuation Characterization (SLAC) procedure against the discovered charging device.

In order to carry on a SLAC procedure, the controller can be further configured to: send an attenuation request signal; receive one or more attenuation response signals; store at least one first charging device corresponding to the received attenuation response signals in a second storage; perform the charging operation with a charging device having the lowest attenuation value or average among the at least one first charging device, based on the received attenuation response signals; and store information regarding the charging device used for the charging operation, in the first storage after the charging operation is completed.

Further, in order to perform the SLAC procedure, the controller can be further configured to: request values of the attenuation response signals from at least one charging device; receive the values of the attenuation response signals from the at least one charging device during a predetermined time; and store at least one second charging device corresponding to the values of the attenuation response signals in the second storage.

The second storage can include a buffer table, and the controller may be further configured to: when the at least one first charging device is the same as the at least one second charging device, overlap information about both the at least one first charging device and the at least one second charging device at the same location in the buffer table; and when the at least one first charging device is different from the at least one second charging device, store information about both the at least one first charging device and the at least one second charging device at different locations in the buffer table.

In order to send the attenuation request signal, the controller can be further configured to: broadcast a start attenuation signal at least three times; and to transmit an attenuation check signal repeatedly.

In order to store the information regarding the charging device in the first storage, the controller can be further configured to: store the last attenuation value or average of the charging device; and to increase a charging history count of the charging device by 1.

In order to perform the charging operation with the discovered charging device, the controller can be further configured to: measure a signal level attenuation of the discovered charging device; when the measured signal level attenuation is within a predefined allowable range, proceed with the charging operation; and when the measured signal level attenuation is outside of the predefined allowable range, stop the charging operation.

In order to proceed with the charging operation, the controller can be further configured to: carry out the charging operation with the discovered charging device; compare the measured signal level attenuation with an attenuation value or average stored in the first storage; and when a difference between the measured signal level attenuation and the stored attenuation value or average is outside of a predetermined range, provide a request for inspection or maintenance of a communication cable corresponding to the charging operation.

The request can be provided to both the vehicle and the charging device used for the charging operation.

The list of charging equipment can store a Media Access Control (MAC) address of the discovered charging device.

Furthermore, according to embodiments of the present disclosure, an apparatus for controlling engagement between a vehicle and a charging device includes: a processing system including at least one data processor and at least one computer-readable memory storing a computer program, wherein the processing system is configured to cause the apparatus to: attempt to discover a charging device; when the charging device is discovered, identify the discovered charging device on a list of charging equipment stored in the vehicle; determine a charging history count of the discovered charging device according to the stored list of charging equipment; when the charging history count of the discovered charging device is greater than or equal to a predetermined number, perform a charging operation with the discovered charging device; and when the charging history count of the discovered charging device is less than the predetermined number, perform a Signal Level Attenuation Characterization (SLAC) procedure against the discovered charging device.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Reference will now be made in detail to the embodiments of the disclosure, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller/control module. The term "controller" or "control module" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller/control module in conjunction with one or more other components, as would be appreciated by a person of ordinary skill in the art.

In the description of the disclosure, certain detailed explanations of related art are omitted when it is deemed that they may unnecessarily obscure the essence of the disclosure. The features of the disclosure will be more clearly understood from the accompanying drawings and should not be limited by the accompanying drawings. It is to be appreciated that all changes, equivalents, and substitutes that do not depart from the spirit and technical scope of the disclosure are encompassed in the disclosure.

International standards for describing charging infrastructures can include ISO/IEC 15118 and IEC 61851-1. These international standards can provide a fundamental compatibility for a communication procedure and a signal processing procedure so as to support an effective charging operation between electric vehicles and charging station (i.e., charge spots). Herein, an electric vehicle can include all-electric or battery electric vehicles (BEVs), plug-in hybrid vehicles (PHEVs), and electric vehicle conversions of hybrid electric vehicles.

For the way of example but not limitation, a combined charging system ("combo") method using a signal connector (or charger) configured to support both AC and DC charging operations for electric vehicles is internationally standardized by the ISO/IEC 15118. Specifically, ISO/IEC 15118-3 may define a physical layer and a data link layer, which use IEEE 1901 Profile Green PHY and IEEE 802.3 MAC. The IEEE 1901 Profile Green PHY suggested by the HomePlug Powerline alliance is one of profile criterions, which is considered HomePlug Green PHY (HPGP) based on Power Line Communication (PLC) technologies. The HPGP technology can include a wide-band power line communication using signals of 1.8 to 28 MHz frequency, and support a communication speed of 10 Mbps.

Further, another international standard IEC 61851-1 (Electric Vehicle Conductive Charging System—Part1: General Requirements) handles general requirements such as rating of supply voltage or current in a charging system, connection between a power supply and EVs, EV charging modes, charging interface, and so on. Further, electromagnetic compatibility (EMC) requirements for an onboard charger are described in IEC 61851-21-1 (Electric Vehicle Onboard Charger EMC Requirements for Conductive Connection to A.C./D.C. Supply), and electromagnetic compatibility (EMC) requirements for a DC charger are shown in IEC 61851-21-2 (EMC Requirements for Off Board Electric Vehicle Charging Systems). Further, IEC 61851-23 (D.C. Electric Vehicle Charging Station) describes techniques for an Off-Board Charger in a charging system.

Figure 1:
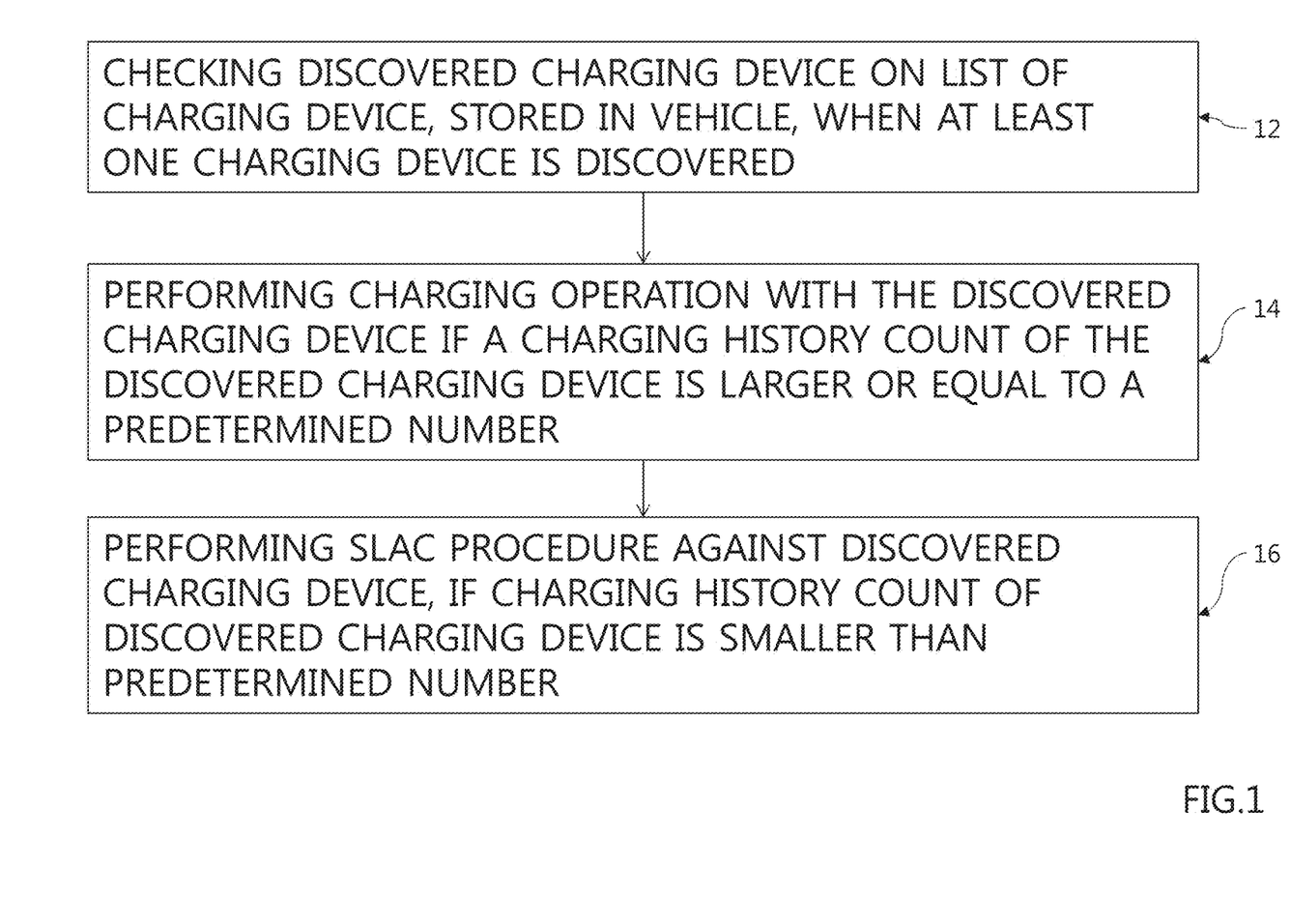
FIG. 1 shows a method for controlling a vehicle for engagement with charging equipment.

FIG. 1 shows a method for controlling a vehicle for engagement with charging equipment.

As shown in FIG. 1, the method for controlling a vehicle for engagement with charging equipment includes identifying the discovered charging device on a list of charging devices, stored in a vehicle, when at least one charging device is discovered (step 12), performing charging operation with the discovered charging device if a charging history count of the discovered charging device is larger or equal to a predetermined number (step 14), and performing a Signal Level Attenuation Characterization (SLAC) procedure against the discovered charging device if the charging history count of the discovered charging device is smaller than the predetermined number (step 16).

In order to charge an electric vehicle, the electric vehicle can be connected to charging equipment. In engagement between the electric vehicle and the charging equipment, they should recognize each other existed, and know status of each other which can perform charging operation. Further, charging equipment used commonly, not exclusively, can recognize an electric vehicle to determine a billing against the electric vehicle which is connected for the charging operation. As a method for making an electric vehicle and charging equipment recognize each other and perform charging operation, an international standard suggests some procedures for a Signal Level Attenuation Characterization (SLAC). In a situation when there are plural plug-in electric vehicle (PEV) and plural electric vehicle supply equipment (EVSE), the SLAC can measure strength for signals transferred between them.

Referring to the SLAC, a charging controller in an electric vehicle can request a parameter required for the SLAC to charging equipment. When the charging equipment responds the parameter for the SLAC, the charging controller can determine the parameter and inform the charging equipment of beginnings of sending signals used for signal attenuation. Thereafter, the charging controller can repeatedly transmit the signals used for signal attenuation to the charging equipment. The charging equipment can measure attenuation value of the received signals and deliver measured value into the charging controller. In response to delivered value, the charging controller can determine which charging equipment is selected for charging operation.

Referring again to FIG. 1, the SLAC can use charging history information to specify connected charging equipment more accurately and faster. If an electric vehicle recognizes at least one charging machine after moving to a place (e.g., a charging station) which charging equipment is located in, the electric vehicle can determine charging history information of the at least one charging machine. For these works, the electric vehicle can include a storage configured to store charging history information.

The electric vehicle can be connected to the charging equipment through Power Line Communication (PLC) technologies. After PLC communication is initialized during an initial procedure according to the standard IEC 61851-1, the SLAC can be carried on, which is a technique to discover charging equipment based on the standard ISO/IEC 15118-3.

If a charging history count (i.e., the number of previous charging operations with a specific charging machine or charging equipment) is beyond a predetermined number when an electric vehicle determines the charging history information, the electric vehicle can proceed with charging operation directly without the SLAC. For example, without limitation, when an electric vehicle can know that, referring to charging history information, it is charged a predetermined number of times during a predetermined period (e.g., 10 times in the last month) by a particular charging machine or equipment, the electric vehicle can perform charging operation with the particular charging machine or equipment when recognizing it without the SLAC. This operation can be allowable because the electric vehicle can store the charging history information regarding the particular charging machine or equipment. Thus, procedures or processes required for charging operation can be simplified so that the electric vehicle can be charged faster.

Figure 2:
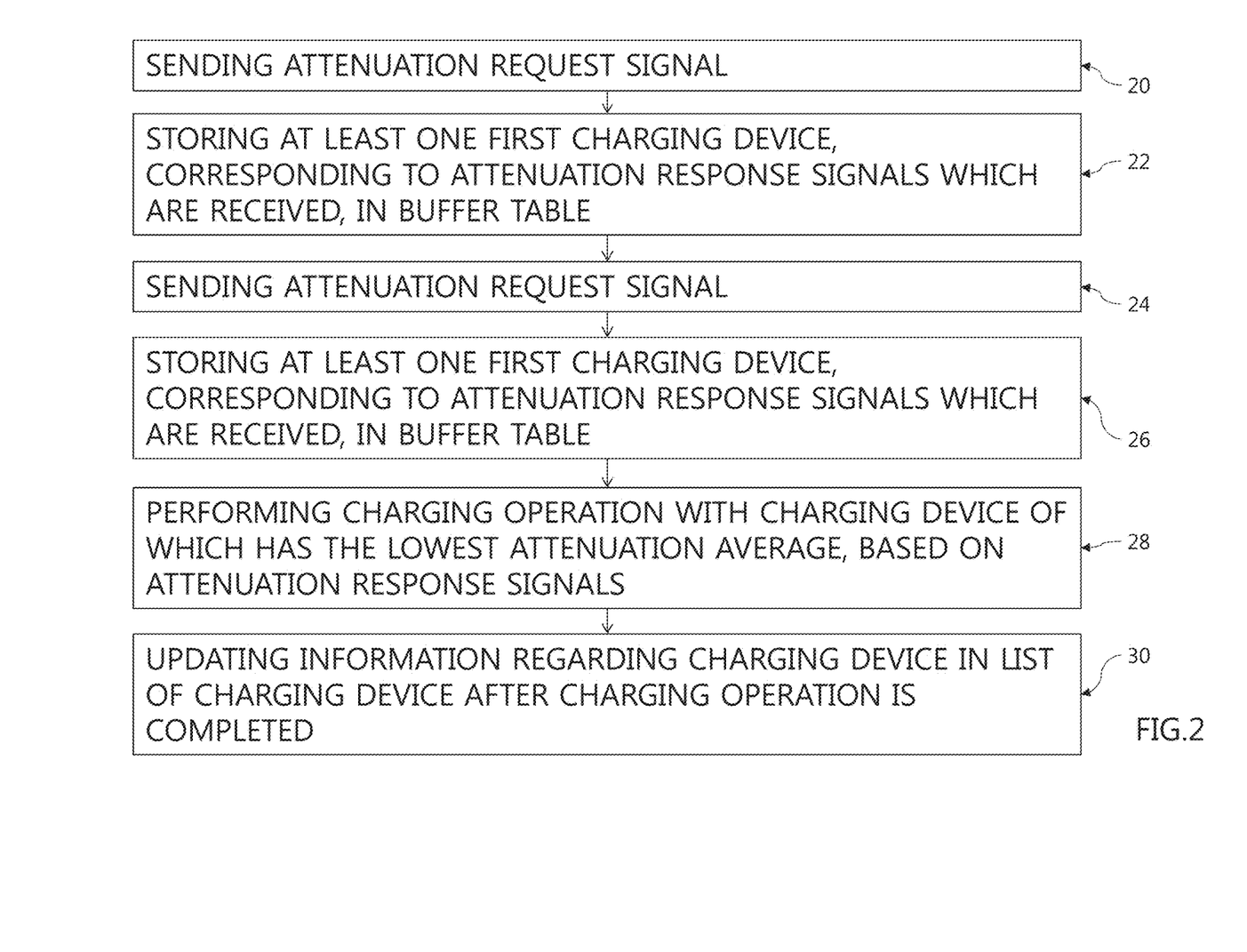
FIG. 2 shows a method for Signal Level Attenuation Characterization (SLAC)

FIG. 2 shows a method for Signal Level Attenuation Characterization (SLAC).

As shown in FIG. 2, the SLAC procedure can include sending an attenuation request signal (step 24), storing at least one first charging device, corresponding to attenuation response signals which are received, in a buffer table (step 26), performing the charging operation with the charging device of which has the lowest attenuation value or average among the at least one first charging device, based on the attenuation response signals (step 28), and storing information regarding the charging device, which is used for the charging operation, in the list of charging device after the charging operation is completed (step 30).

The step of sending an attenuation request signal (step 24) can comprise broadcasting a start attenuation signal at least three times, and transmitting an attenuation check signal repeatedly. Herein, the start attenuation signal transmitted by a plug-in electric vehicle (PEV) can include a multi-network broadcast (MNBC) message which can be delivered into at least one charging machine. Further, to increase operation reliability, the PEV can send the start attenuation signal at least three times. The start attenuation signal can be transmitted with values corresponding to parameters delivered from at least one charging machine or charging equipment.

When the start attenuation signal is broadcasted, charging equipment can make provision for receiving at least one attenuation request signal. Thereafter, when an electric vehicle transmits the attenuation request signal, the charging equipment can measure signal attenuation based on delivered attenuation request signal. The electric vehicle can broadcast plural attenuation request signals, and the charging equipment can determine a value or average of signal attenuation based on the plural attenuation request signals. The charging equipment can transmit the value or average of signal attenuation to the electric vehicle via an attenuation response signal. The electric vehicle can store a result (i.e., the average of signal attenuation included in the attenuation response signal) in a buffer table.

Further, the step of performing a SLAC procedure can further comprise requesting values or parameters of the attenuation response signals from at least one charging device (step 20), and storing at least one second charging device which corresponds to the values of the attenuation response signals, which are delivered during a predetermined time, in the buffer table (step 22). The vehicle can request a response message including values or parameters from at least one charging machine or charging equipment via a multicast network. In response to a parameter request signal, the charging equipment can transmit the response message including the values or the parameters to the electric vehicle. The electric vehicle receiving the response message can store the values or the parameters delivered from the charging equipment in the buffer table.

Charging equipment can have a unique address. An electric vehicle can include a buffer table configured to store information of charging equipment. If at least one first charging machine or device is the same with the at least one second charging machine or device, information about both the first and the second charging device can be overlapped at the same location of the buffer table. Otherwise, if at least one first charging device is different from at least one second charging device, information about both the first and the second charging device can be stored at different locations of the buffer table. For example, without limitation, even though a charging machine may not respond or its response may not be delivered when an electric vehicle requests values or parameters, the charging machine can use a broadcasted attenuation request signal in order to measure signal attenuation, and deliver measured signal attenuation into the electric vehicle. The electric vehicle can receive the measured signal attenuation delivered from the charging machine of which values or parameters are not transmitted. Accordingly, when a charging machine sending values or parameters is the same with a charging machine sending signal attenuation, the signal attenuation can be stored at the location of corresponding charging machine in the buffer table. However, if signal attenuation is delivered from a charging machine of which values or parameters are not delivered, the electric vehicle can add a new charging machine in the buffer table, and update signal attenuation corresponding to the new charging machine.

After accessing a list of charging equipment in the buffer table, the electric vehicle can choose charging equipment returning the lowest value or average of signal attenuation among all of charging equipment as a partner for performing charging operation. This procedure can provide that effective connectivity between the electric vehicle and the charging equipment is achieved for the charging operation, and the charging operation can be performed more safely.

Further, the step of storing information regarding the charging machine or device in the list of charging equipment can include storing the last attenuation value or average regarding the charging machine or device, and increasing a charging history count of the charging machine or device by one (1). An electric vehicle which completes the charging operation with a particular charging machine can store information about the last charging operation as charging history information. For example, the electric vehicle can store an address of charging equipment connected for charging operation, a value or average of signal attenuation for the charging operation, a charging history count for a predetermined time period, and so on.

Figure 3:
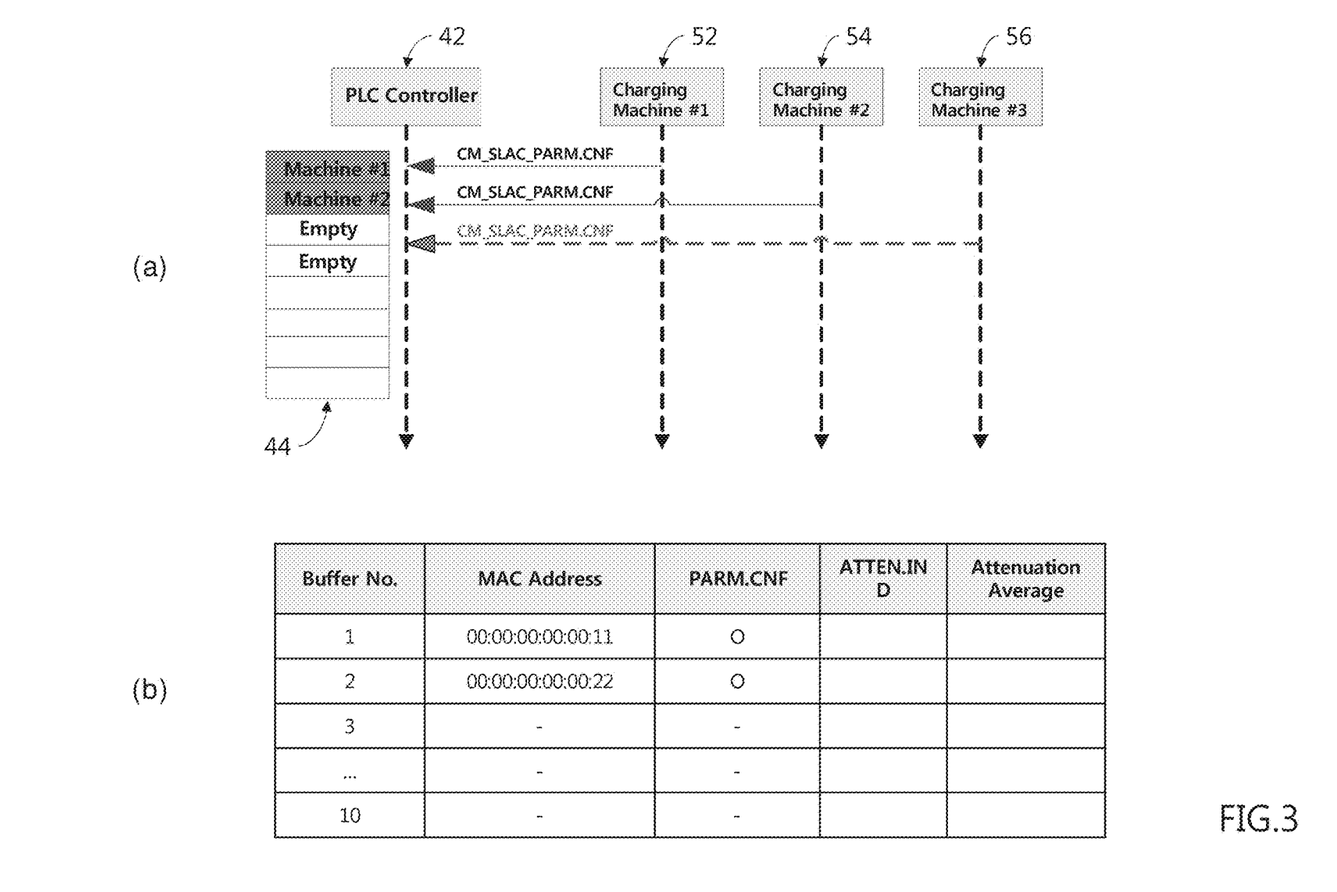
FIG. 3 describes a procedure performed for requesting and responding a parameter in the SLAC procedure.

FIG. 3 describes a procedure performed for requesting and responding a parameter in the SLAC procedure. Particularly, (a) shows a response to a request for values or parameters, and (b) shows a buffer table including information regarding charging equipment in an electric vehicle.

As shown in FIG. 3, a procedure for requesting and responding values or parameters in order to perform the SLAC is carried on between an electric vehicle and charging machines 52, 54, 56. The electric vehicle can include a PLC controller 42 configured to control a PLC communication.

Additionally, a request for SLAC values or parameters (e.g., CM_SLAC_PARM.REQ) can be achieved by sending a sort of broadcasting message which a plurality of unspecified charging machines can check or receive (not shown). It is possible that each of plural charging machines (e.g., a first charging machine 52, a second charging machine 54) transmits a SLAC parameter response CM_SLAC_PARM.CNF in response to the request for SLAC values or parameters.

The PLC controller 42 prepares a buffering area 44 configured to store information of charging equipment, and stores all of SLAC parameter responses delivered from the plurality of unspecified charging machine for a predetermined time. But, the PLC controller 42 can additionally confirm whether each SLAC parameter response is correctly delivered because the SLAC parameter response delivered from some charging equipment may appertain to another electric vehicle which is adjacent for charging operation.

Referring now to (a) of FIG. 3, a third charging machine 56 does not respond with its SLAC parameter, so the buffer table shown in (b) can include information about only two charging machines, i.e., information about the third charging machine 36 does not exist in the buffer table.

If there is no SLA parameter responses for the predetermined time, the electric vehicle can perform the step of requesting SLAC values or parameters again.

Figure 4:
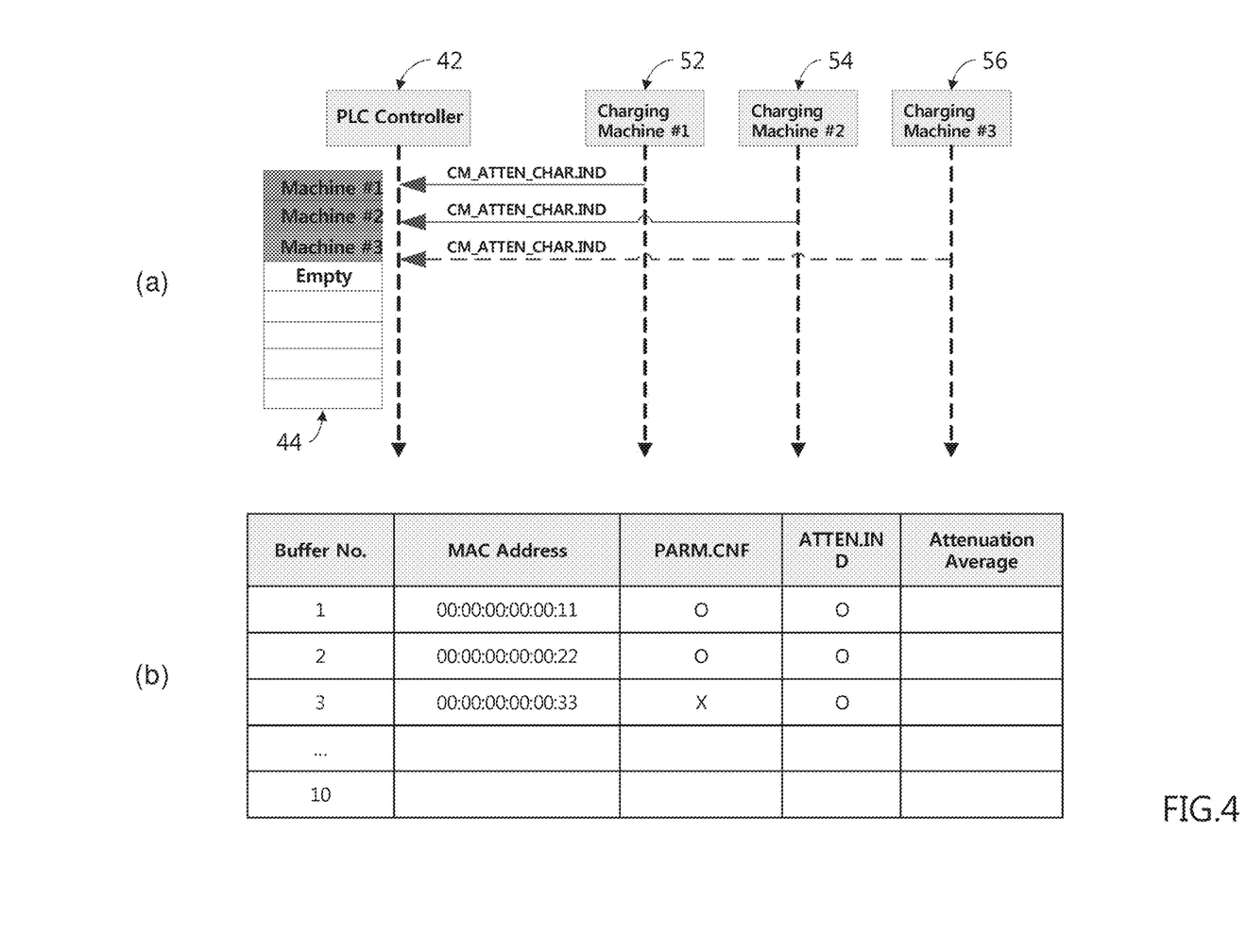
FIG. 4 describes a procedure performed for answering a result of signal level attenuation.

FIG. 4 describes a procedure performed for answering a result of signal level attenuation. Particularly, (a) shows a response message regarding signal attenuation, while (b) shows a buffer table storing information about charging equipment.

As shown in FIGS. 2 to 4, an electric vehicle can broadcast at least one start attenuation signal and at least one attenuation check signals, while charging equipment can measure signal attenuation based on the attenuation check signal. After measurement, each of plural charging machines 52, 54, 56 can transmit a signal attenuation response message CM_ATTEN_CHAR.IND to the PLC controller 42 included in the electric vehicle. The electric vehicle can receive the signal attenuation response messages transmitted from the first charging machine 52 and the second charging machine 54 which are already recognized by each of SLAC parameter responses CM_SLAC_PARM.CNF shown in FIG. 3. Further, the electric vehicle can receive the signal attenuation response message transmitted from the third charging machine 56 of which SLAC parameter response CM_SLAC_PARM.CNF shown in FIG. 3 is not previously delivered.

Further, the electric vehicle can determine whether at least one signal attenuation response message transmitted from at least one charging machine heads for itself.

Referring now to (b) of FIG. 4, according to the signal attenuation response messages shown in (a) of FIG. 4, the electric vehicle can store information about each of the first to third charging machines 52, 54, 56 such as its address, its SLAC parameter, its signal attenuation, and etc.

Figure 5:
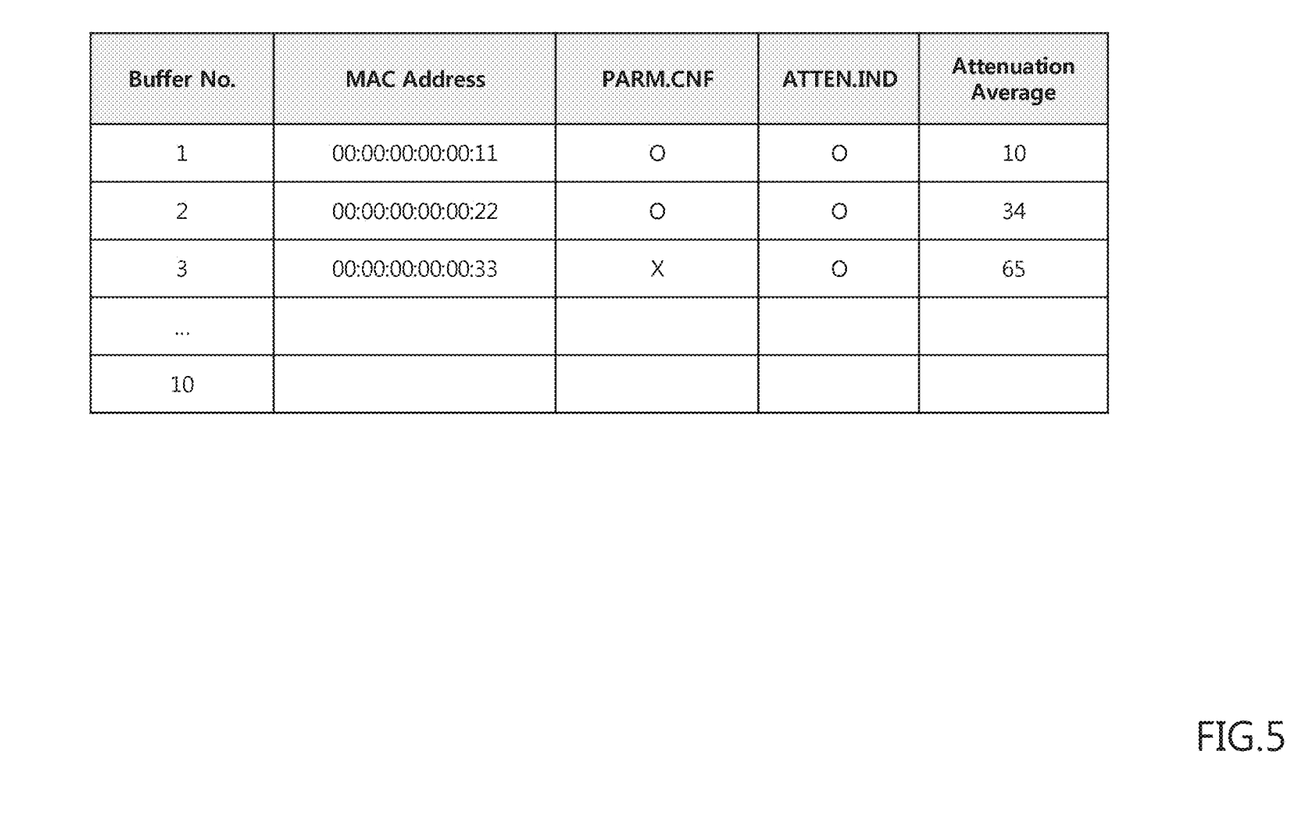
FIG. 5 describes how to determine a charging device according to the result of signal level attenuation.

FIG. 5 describes how to determine a charging device according to the result of signal level attenuation.

As shown in FIG. 5, after the SLAC procedure, an electric vehicle can store information about charging equipment available to be engaged with the electric vehicle in a buffer table. The electric vehicle can choose one of charging machines based on the information stored in the buffer table. By the way of example but not limitation, the electric vehicle can select a first charging machine (e.g., Buffer No. 1 in FIG. 5) of plural charging machines currently available for charging operation, which has the lowest attenuation value or average (e.g., 10 in FIG. 5).

Herein, by an electric vehicle, whether particular charging equipment transmits or responds its SLAC values or parameters can be considered a sort of reference, not a critical or essential requisite for carrying on charging operation with that charging equipment. If signal attenuation is the lowest at a charging machine which has not answered its SLAC values or parameters, the electric vehicle can be engaged with the charging machine for charging operation.

Figure 6:
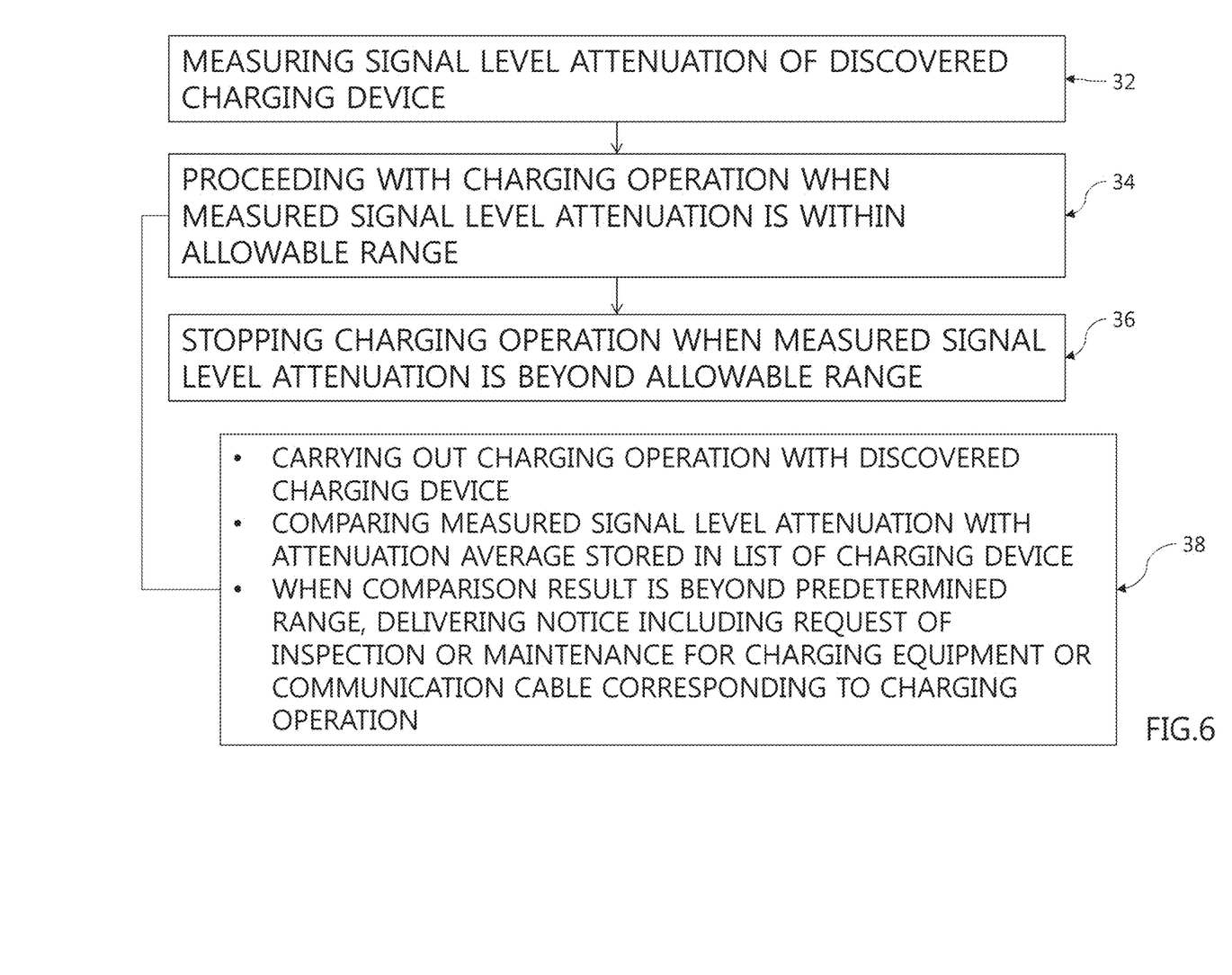
FIG. 6 shows a method for carrying on a charge operation for a vehicle.

FIG. 6 shows a method for carrying on a charge operation for a vehicle.

As shown in FIG. 6, the step of performing charging operation with the discovered charging device can include measuring a signal level attenuation of the discovered charging device (step 32), proceeding with the charging operation when measured signal level attenuation is within an allowable range (step 34), and stopping the charging operation when the measured signal level attenuation is beyond the allowable range (step 36).

The electric vehicle should periodically monitor signal attenuation at charging equipment while the electric vehicle is engaged with the charging equipment for charging operation. This can determine whether connectivity between the electric vehicle and the charging equipment remains stable.

When the signal attenuation is below a threshold during the charging operation, the electric vehicle can stop the charging operation. For example, without limitation, the charging operation can be suspended by an event occurred at the charging machine or the electric vehicle in order to secure safety for charging operation.

Further, the step of proceeding with the charging operation (step 34) can include at least one of carrying out the charging operation with the discovered charging device (step 38), comparing the measured signal level attenuation with an attenuation value or average stored in the list of charging device (step 38), and, when a comparison result is beyond a predetermined range, delivering a notice including request of inspection or maintenance for charging equipment or a communication cable corresponding to the charging operation, into both the vehicle and the charging device used for the charging operation (step 38).

While an electric vehicle is coupled to charging equipment and charging operation is performed, the electric vehicle can compare signal attenuation measured for current charging operation with one stored in a list of charging equipment. For the way of example but not limitation, when the electric vehicle is coupled to a particular charging machine which was engaged for previous charging operation, the electric vehicle can compares the last signal attenuation stored therein with current signal attenuation. When the two signal attenuation are so far apart (i.e., the difference between the two signal attenuation is beyond a predetermined range (e.g., 10%)), it is foreseeable that at least one of electric vehicle and charging equipment can include a problem or issue to support charging operation. In this case, a notice to request inspection or maintenance can be delivered into both the electric vehicle and the charging equipment. These procedures can help a manager or a user to monitor condition of charging equipment. Particularly, at a charging station, the manager or the user can understand deterioration or superannuated status of charging equipment as well as critical issues such as a problem on a communication cable to obstruct charging operation.

Figure 7:
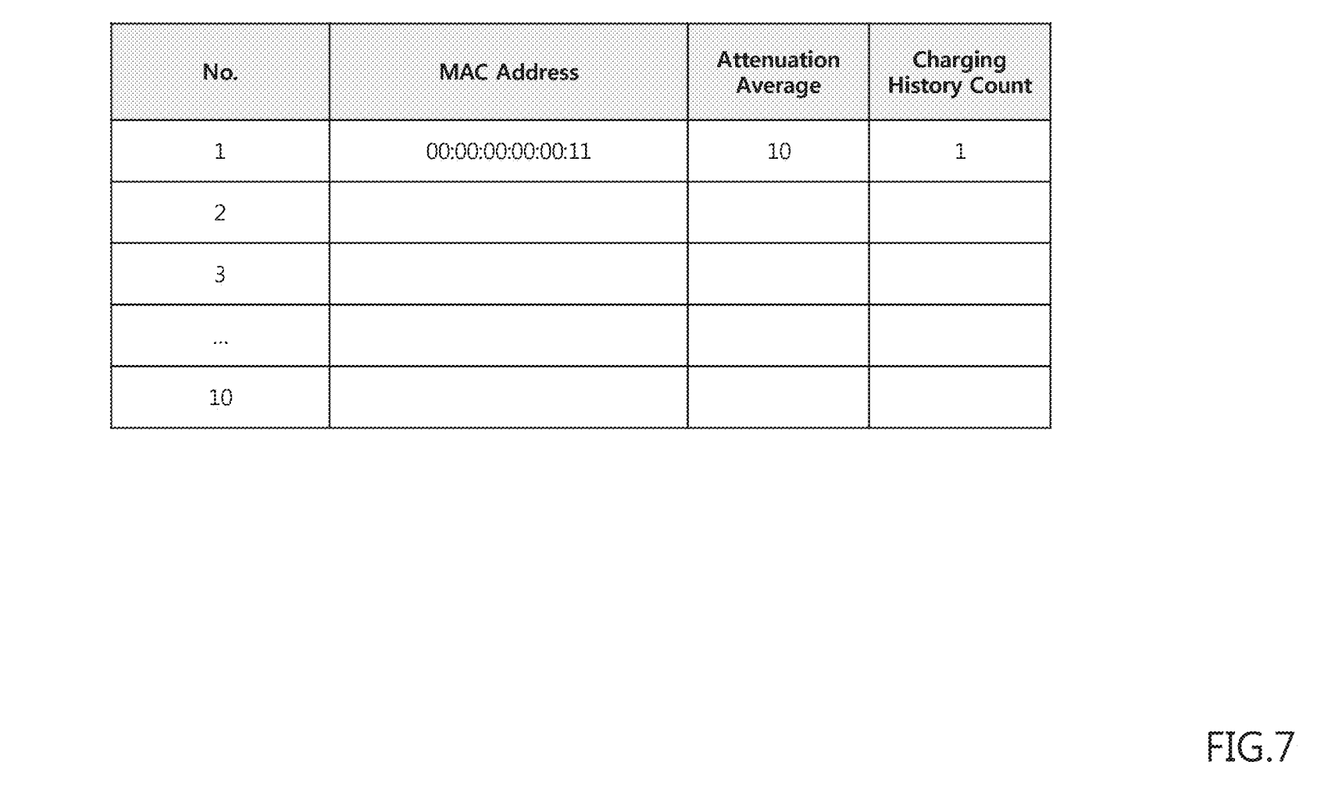
FIG. 7 describes a storage configured to store charging history information after the charge operation is completed.

FIG. 7 describes a storage configured to store charging history information after the charge operation is completed.

As shown in FIG. 7, if the charging operation is successfully completed, an electric vehicle can input a charging history count and information relevant to engaged charging equipment into an additional storage (e.g., a list of charging equipment). By the way of example but not limitation, the list of charging equipment can store a Media Access Control (MAC) address of the discovered charging device, its charging history count of completed charging operation for a predetermined time, its signal attenuation value or average, and the like.

The information above described can be maintained even if the electric vehicle (or a PLC controller of vehicle) is completed turned off. When the storage has no enough space to store new or additional information, the electric vehicle can remove or delete information corresponding to a specific charging machine which has the lowest charging history count if coupling to a new charging machine for charging operation.

Further, the list of charging equipment can include a charging history count for only a predetermined period. The list of charging equipment can include information about charging equipment limited by user's or driver's preference such as a location or a particular area where a user or a driver set up or designate as a preference.

The list of charging equipment can be used to directly preceding with charging operation without waiting for response messages including signal attenuation measured by at least one charging machine engage. If the charging history count of a specific charging machine available for charging operation is beyond a predetermined number (e.g., 10), the charging operation between the specific charging machine and the electric vehicle can be performed without determining signal attenuation.

If information regarding a charging machine coupled to an electric vehicle exists in a storage (e.g., a list of charging machine) and a difference between current and previous signal attenuation (or signal attenuation value or average) is within a predetermined allowable range, the electric vehicle can carry on charging operation with the charging machine. However, at this time, if the difference is larger than a predetermined threshold (e.g., 10%), the charging operation can be performed, but a notice requesting inspection or maintenance for charging equipment such as a communication cable can be delivered into a user or both the electric vehicle and the charging equipment.

Figure 8:
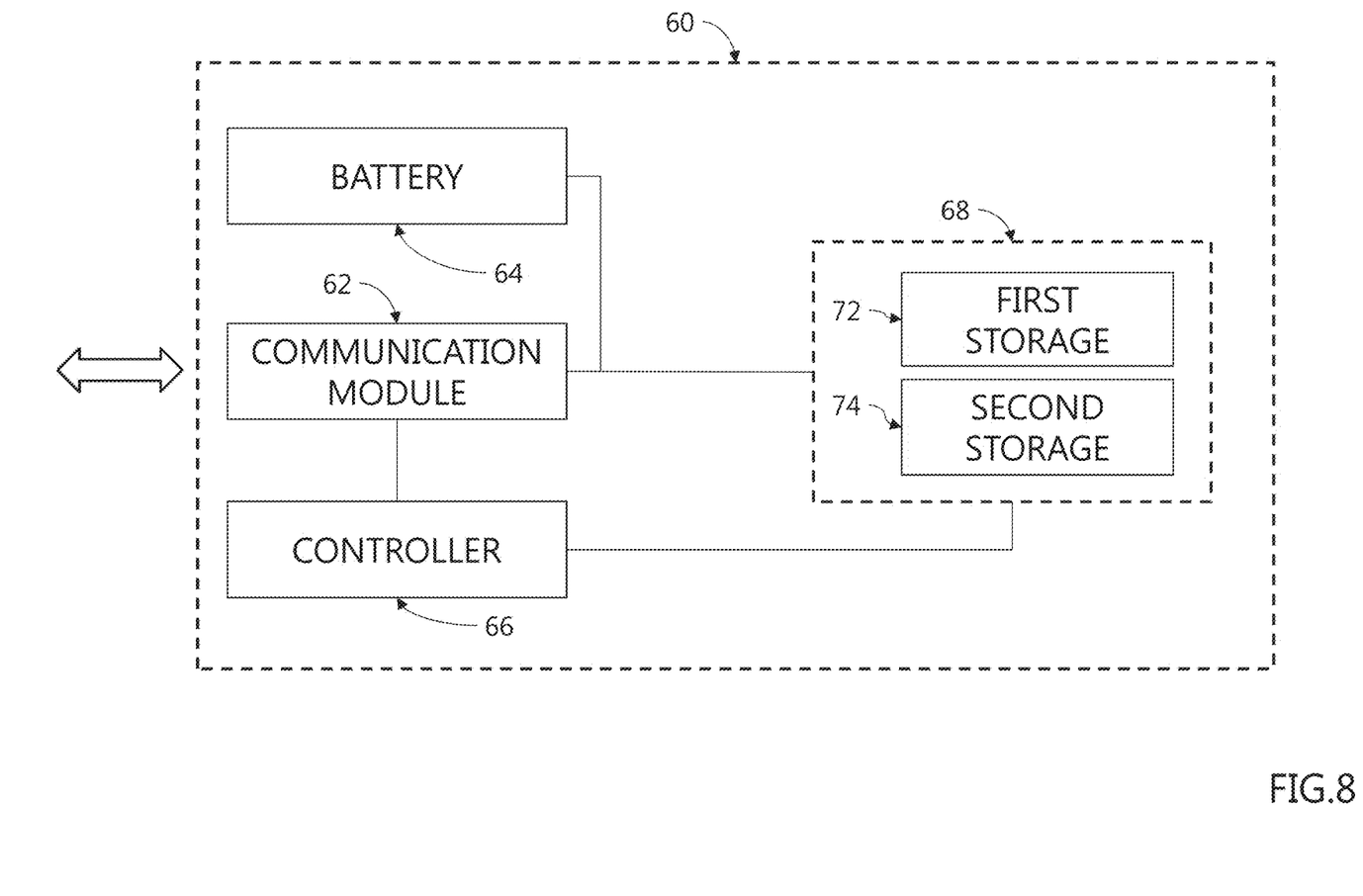
FIG. 8 shows an apparatus for controlling a vehicle for engagement with charging equipment.

FIG. 8 shows an apparatus for controlling a vehicle for engagement with charging equipment.

As shown in FIG. 8, a control apparatus 50 can be provided for engaging with charging equipment for charging operation. The control apparatus 60 can include a first storage 72 including a list of charging equipment used for previous charging operations, a communication module 62 configured to discover at least one charging device, and a control module 72 configured to identify the discovered charging device on the list of charging equipment when at least one charging device is discovered. The control module 72 can be further configured to perform a current charging operation with the discovered charging device if a charging history count of the discovered charging device is larger or equal to a predetermined number, and to perform a Signal Level Attenuation Characterization (SLAC) procedure against the discovered charging device if the charging history count of the discovered charging device is smaller than the predetermined number.

Through data communication with charging equipment, the communication module 62 can perform an initial process required for charging operation. Further, after starting the charging operation, the communication module 62 can receive a power signal and transfer received power signal to a battery 64 so that the battery 64 can be charged.

In order to carry on the SLAC procedure, the controller can be configured to send an attenuation request signal, store at least one first charging device, corresponding to attenuation response signals which are received, in a second storage 74, perform the charging operation with the charging device of which has the lowest attenuation value or average among the at least one first charging device, based on the attenuation response signals, and store information regarding the charging device, which is used for the charging operation, in the first storage 72 after the charging operation is completed.

Further, in order to perform the SLAC procedure, the controller 66 is configured to request values of the attenuation response signals from at least one charging device, and store at least one second charging device which corresponds to the values of the attenuation response signals, which are delivered during a predetermined time, in the second storage 74.

The first storage 72 and the second storage 74 can be included in a storage unit 68. According to embodiments of the present disclosure, the first and second storages 72, 74 can be implemented in different storage mediums, or separate spaces of a single storage medium. For the way of example but not limitation, the second storage 74 can include a buffer table. Further, the controller 66 can be configured to overlap information about both the first and the second charging device at the same location if the at least one first charging device is the same with the at least one second charging device, and to store information about both the first and the second charging device at different locations if the at least one first charging device is different from the at least one second charging device.

In order to send an attenuation request signal, the controller 66 can be configured to broadcast a start attenuation signal at least three times, and to transmit an attenuation check signal repeatedly.

The controller 66 can store information regarding the charging device in the first storage 72. Regarding the information, the controller 66 is configured to store the last attenuation value or average regarding the charging equipment and to increase a charging history count of the charging device by one.

In order to perform charging operation with the discovered charging device, the controller 66 can be configured to measure a signal level attenuation of the discovered charging device, proceed with the charging operation when measured signal level attenuation is within an allowable range, and stop the charging operation when the measured signal level attenuation is beyond the allowable range.

In order to proceed with the charging operation, the controller 66 can be configured to carry out the charging operation with the discovered charging device, and to compare the measured signal level attenuation with an attenuation value or average stored in the first storage 72. When a comparison result is beyond a predetermined range, the controller 66 can transmit a notice requesting inspection or maintenance for a communication cable corresponding to the charging operation. Herein, the notice can be delivered into both the vehicle and the charging device used for the charging operation.

The first storage 72 can include a list of charging equipment. For example, the list of charging equipment can store information about discovered charging devices such as their Media Access Control (MAC) address, their signal attenuation value or average, their charging history count, and etc.

As above described, the embodiments of the present disclosure provide an electric vehicle that discover or recognize at least one charging device more quickly based on charging history information. Further, the embodiments of the present disclosure support an inspection or maintenance of infrastructure by informing an attenuation status of charging device or power cable in charging equipment, due to superannuation, which are coupled to the electric vehicle during procedures for charging operation.

The aforementioned embodiments are achieved by combination of structural elements and features of the disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the disclosure. The order of operations described in the embodiments of the disclosure may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof.

It will be apparent to those skilled in the art that various modifications and variations can be made in the disclosure without departing from the spirit or scope of the disclosures. Thus, it is intended that the disclosure covers the modifications and variations of this disclosure provided they come within the scope of the appended claims and their equivalents.

What is claimed is:

1. A method for controlling engagement between a vehicle and a charging device, the method comprising:
    attempting to discover a charging device;
    when the charging device is discovered, identifying the discovered charging device on a list of charging equipment stored in the vehicle;
    determining a charging history count of the discovered charging device according to the stored list of charging equipment;
    when the charging history count of the discovered charging device is greater than or equal to a predetermined number, performing a charging operation with the discovered charging device; and
    when the charging history count of the discovered charging device is less than the predetermined number, performing a Signal Level Attenuation Characterization (SLAC) procedure against the discovered charging device.

2. The method according to claim 1, wherein the performing of the SLAC procedure comprises:
    sending an attenuation request signal;
    receiving one or more attenuation response signals;
    storing an attenuation value of at least one first charging device corresponding to the received attenuation response signals in a buffer table;
    performing the charging operation with a charging device having the lowest attenuation value among the at least one first charging device, based on the received attenuation response signals; and storing information regarding the charging device used for the charging operation in the list of charging equipment after the charging operation is completed.

3. The method according to claim 2, wherein the performing of the SLAC procedure further comprises:
   requesting values of the attenuation response signals from at least one charging device;
   receiving the values of the attenuation response signals from the at least one charging device during a predetermined time; and
   storing at least one second charging device corresponding to the received values of the attenuation response signals in the buffer table.

4. The method according to claim 3, further comprising:
   when the at least one first charging device is the same as the at least one second charging device, overlapping information about both the at least one first charging device and the at least one second charging device at the same location in the buffer table; and
   when the at least one first charging device is different from the at least one second charging device, storing information about both the at least one first charging device and the at least one second charging device at different locations in the buffer table.

5. The method according to claim 2, wherein the sending of the attenuation request signal comprises:
   broadcasting a start attenuation signal at least three times; and
   repeatedly transmitting an attenuation check signal.

6. The method according to claim 2, wherein the storing of information regarding the charging device in the list of charging equipment comprises:
   storing the last attenuation average of the charging device; and
   increasing a charging history count of the charging device.

7. The method according to claim 1, wherein the performing of the charging operation with the discovered charging device comprises:
   measuring a signal level attenuation of the discovered charging device;
   when the measured signal level attenuation is within a predefined allowable range, proceeding with the charging operation; and
   when the measured signal level attenuation is outside of the predefined allowable range, stopping the charging operation.

8. The method according to claim 7, wherein the proceeding with the charging operation comprises:
   carrying out the charging operation with the discovered charging device;
   comparing the measured signal level attenuation with an attenuation average stored in the list of charging equipment; and
   when a difference between the measured signal level attenuation and the stored attenuation average is outside of a predetermined range, providing a request for inspection or maintenance of a communication cable corresponding to the charging operation to at least one of the vehicle and the charging device used for the charging operation.

9. The method according to claim 1, wherein the list of charging equipment includes a Media Access Control (MAC) address of the discovered charging device.

10. An apparatus for executing a charging operation with a charging device in a vehicle, the apparatus comprising:
    a first storage including a list of charging equipment used for previous charging operations;
    a communication module attempting to discover a charging device; and
    a controller configured to:
       when the charging device is discovered, identify the discovered charging device on the list of charging equipment;
       determine a charging history count of the discovered charging device according to the list of charging equipment;
       when the charging history count of the discovered charging device is greater than or equal to a predetermined number, perform a charging operation with the discovered charging device; and
       when the charging history count of the discovered charging device is less than the predetermined number, perform a Signal Level Attenuation Characterization (SLAC) procedure against the discovered charging device.

11. The apparatus according to claim 10, wherein the controller, in order to perform the SLAC procedure, is further configured to:
    send an attenuation request signal;
    receive one or more attenuation response signals;
    store an attenuation value of at least one first charging device corresponding to the received attenuation response signals in a second storage;
    perform the charging operation with a charging device having the lowest attenuation value among the at least one first charging device, based on the received attenuation response signals; and
    store information regarding the charging device used for the charging operation, in the first storage after the charging operation is completed.

12. The apparatus according to claim 11, wherein the controller, in order to perform the SLAC procedure, is further configured to:
    request values of the attenuation response signals from at least one charging device;
    receive the values of the attenuation response signals from the at least one charging device during a predetermined time; and
    store information of at least one second charging device corresponding to the values of the attenuation response signals in the second storage.

13. The apparatus according to claim 12, wherein the second storage includes a buffer table, and the controller is further configured to:
    when the at least one first charging device is the same as the at least one second charging device, overlap information about both the at least one first charging device and the at least one second charging device at the same location in the buffer table; and
    when the at least one first charging device is different from the at least one second charging device, store information about both the at least one first charging device and the at least one second charging device at different locations in the buffer table.

14. The apparatus according to claim 11, wherein the controller, in order to send the attenuation request signal, is further configured to:
    broadcast a start attenuation signal at least three times; and
    repeatedly transmit an attenuation check signal.

15. The apparatus according to claim 11, wherein the controller, in order to store the information regarding the charging device in the first storage, is further configured to:
    store the last attenuation average of the charging device; and
    increase a charging history count of the charging device.

16. The apparatus according to claim 10, wherein the controller, in order to perform the charging operation with the discovered charging device, is further configured to:
    measure a signal level attenuation of the discovered charging device;
    when the measured signal level attenuation is within a predefined allowable range, proceed with the charging operation; and
    when the measured signal level attenuation is outside of the predefined allowable range, stop the charging operation.

17. The apparatus according to claim 16, wherein the controller, in order to proceed with the charging operation, is further configured to:
    carry out the charging operation with the discovered charging device;
    compare the measured signal level attenuation with an attenuation average stored in the first storage; and
    when a difference between the measured signal level attenuation and the stored attenuation average is outside of a predetermined range, provide a request for inspection or maintenance of a communication cable corresponding to the charging operation.

18. The apparatus according to claim 17, wherein the request is provided to at least one of the vehicle and the charging device used for the charging operation.

19. The apparatus according to claim 10, wherein the list of charging equipment stores a Media Access Control (MAC) address of the discovered charging device.

20. An apparatus for controlling engagement between a vehicle and a charging device, comprising:
    a processing system including at least one data processor and at least one computer-readable memory storing a computer program, wherein the processing system is configured to cause the apparatus to:
    attempt to discover a charging device;
    when the charging device is discovered, identify the discovered charging device on a list of charging equipment stored in the vehicle;
    determine a charging history count of the discovered charging device according to the stored list of charging equipment;
    when the charging history count of the discovered charging device is greater than or equal to a predetermined number, perform a charging operation with the discovered charging device; and
    when the charging history count of the discovered charging device is less than the predetermined number, perform a Signal Level Attenuation Characterization (SLAC) procedure against the discovered charging device.

* * * * *